US008009381B2

(12) United States Patent  
Katsumura et al.

(10) Patent No.: US 8,009,381 B2
(45) Date of Patent: Aug. 30, 2011

(54) METHOD AND SYSTEM FOR MANUFACTURING A HARD-DISK DRIVE

(75) Inventors: Yoshiteru Katsumura, Kanagawa (JP); Yasunori Nishimoto, Kanagawa (JP); Alice Okabe, Kanagawa (JP); Hiroshi Fukuyama, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/635,680

(22) Filed: Dec. 10, 2009

(65) Prior Publication Data

US 2011/0072644 A1    Mar. 31, 2011

(30) Foreign Application Priority Data

Dec. 10, 2008  (JP) .................................. 2008-314521

(51) Int. Cl.  
*G11B 21/12* (2006.01)
(52) U.S. Cl. ........................................................ 360/75
(58) Field of Classification Search .................. None  
See application file for complete search history.

(56) References Cited

U.S. PATENT DOCUMENTS

| | | | |
|---|---|---|---|
| 5,485,322 A | | 1/1996 | Chainer et al. |
| 6,611,395 B1 * | | 8/2003 | Chainer et al. ................ 360/75 |
| 6,714,372 B1 * | | 3/2004 | Codilian et al. .............. 360/75 |
| 7,023,633 B2 * | | 4/2006 | Malone, Sr. ................... 360/75 |
| 7,113,358 B2 * | | 9/2006 | Zayas et al. ................... 360/48 |
| 7,145,740 B2 * | | 12/2006 | Zayas et al. ................... 360/48 |
| 7,706,096 B2 * | | 4/2010 | Ito et al. ........................ 360/75 |
| 7,707,060 B2 * | | 4/2010 | Chainer et al. ................ 360/31 |
| 2004/0123025 A1 | | 6/2004 | Chainer et al. |
| 2004/0150903 A1 | | 8/2004 | Malone, Sr. |
| 2010/0134918 A1 * | | 6/2010 | Nishimoto et al. ....... 360/77.05 |

* cited by examiner

*Primary Examiner* — Hoa T Nguyen  
*Assistant Examiner* — James L Habermehl

(57) ABSTRACT

A method for manufacturing a hard-disk drive (HDD). The method for manufacturing a HDD includes writing servo tracks, and writing servo tracks into the HDD using a calculated control target value of a calculated servo pattern overlap amount. Writing servo tracks includes a first, second, third and fourth operation. The first operation includes: producing a first control equation for obtaining a servo pattern overlap amount; and, converting a root-mean-square error (RMSE) into a probability distribution. The second operation includes calculating a second control target value that results in an increased product yield, from the RMSE probability distribution. The third operation includes producing a second control equation for obtaining a calculated servo pattern overlap amount, by assigning the second control target value into the first control equation. The fourth operation includes calculating the calculated control target value using the second control equation and the magnetic-recording-head characteristic value.

10 Claims, 15 Drawing Sheets

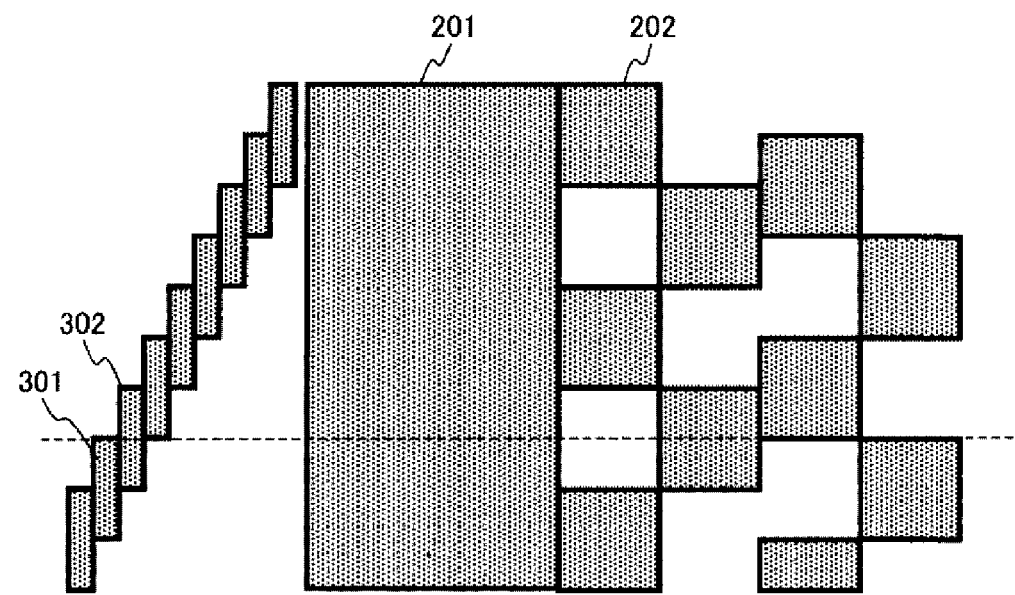
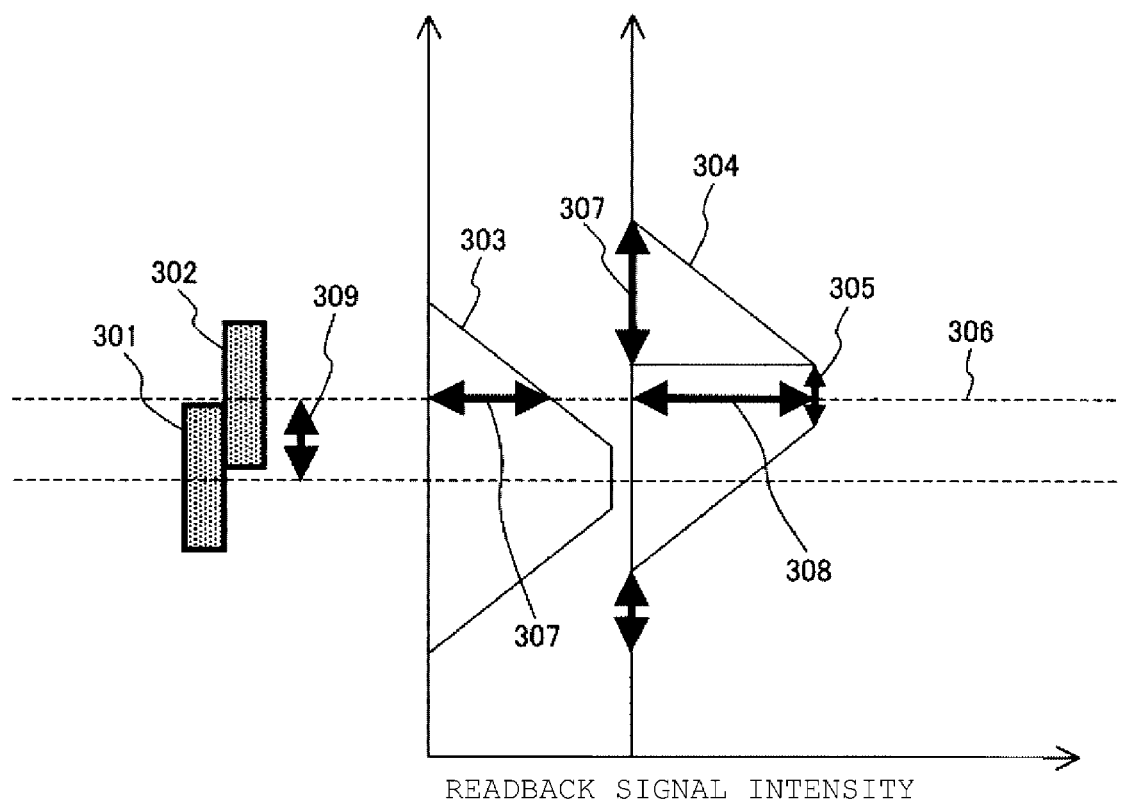
FIG. 3

| SERIES LOWER LIMIT | SERIES UPPER LIMIT | DEFECTIVE PRODUCT PERCENTAGE | DISTRIBUTION A | DISTRIBUTION B | DISTRIBUTION C | DISTRIBUTION D | DISTRIBUTION E | DISTRIBUTION F | DISTRIBUTION G | DISTRIBUTION H |
|---|---|---|---|---|---|---|---|---|---|---|
| 152 | 154 | 33% | | | | | | | | 1% |
| 154 | 156 | 25% | | | | | | | 1% | 2% |
| 156 | 158 | 18% | | | | | | 1% | 2% | 3% |
| 158 | 160 | 17% | | | | | 1% | 2% | 3% | 8% |
| 160 | 162 | 12% | | | | 1% | 2% | 3% | 8% | 11% |
| 162 | 164 | 10% | | | 1% | 2% | 3% | 8% | 11% | 16% |
| 164 | 166 | 9% | | 1% | 2% | 3% | 8% | 11% | 16% | 18% |
| 166 | 168 | 9% | 1% | 2% | 3% | 8% | 11% | 16% | 18% | 16% |
| 168 | 170 | 8% | 2% | 3% | 8% | 11% | 16% | 18% | 16% | 11% |
| 170 | 172 | 8% | 3% | 8% | 11% | 16% | 18% | 16% | 11% | 7% |
| 172 | 174 | 8% | 8% | 11% | 16% | 18% | 16% | 11% | 7% | 4% |
| 174 | 176 | 9% | 11% | 16% | 18% | 16% | 11% | 7% | 4% | 2% |
| 176 | 178 | 10% | 16% | 18% | 16% | 11% | 7% | 4% | 2% | 1% |
| 178 | 180 | 11% | 18% | 16% | 11% | 7% | 4% | 2% | 1% | |
| 180 | 182 | 13% | 16% | 11% | 7% | 4% | 2% | 1% | | |
| 182 | 184 | 14% | 11% | 7% | 4% | 2% | 1% | | | |
| 184 | 186 | 15% | 7% | 4% | 2% | 1% | | | | |
| 186 | 188 | 21% | 4% | 2% | 1% | | | | | |
| 188 | 190 | 23% | 2% | 1% | | | | | | |
| 190 | 192 | 28% | 1% | | | | | | | |
| TRACK PITCH TARGET VALUE | | | 179 | 177 | 175 | 173 | 171 | 169 | 167 | 165 |
| PERCENT DEFECTIVE EXPECTED VALUE | | | 11.7% | 10.7% | 9.8% | 9.2% | 9.0% | 9.1% | 9.6% | 10.8% |

FIG. 6

| MANUFACTURING DATE AND TIME | PRODUCT SERIAL NUMBER | PARTS NUMBER | OVERLAP AMOUNT | TRACK WIDTH | READING WIDTH | SQUEEZE AMOUNT |
|---|---|---|---|---|---|---|
| 2008-08-01T07:42:14 | MB00D1KB | F04D006529 | 0.55 | 182 | 260 | 28 |
| 2008-08-01T07:44:12 | MB00BZ4B | F04D703F03 | 0.55 | 176 | 260 | 37 |
| 2008-08-01T07:44:58 | MB00BY2B | F04D708532 | 0.54 | 182 | 282 | 19 |
| 2008-08-01T07:45:35 | MB00D1GB | F04DD07E24 | 0.60 | 183 | 257 | 19 |
| 2008-08-01T07:46:32 | MB00BZAB | F04D703F16 | 0.53 | 175 | 288 | 25 |
| 2008-08-01T07:46:34 | MB00BXSB | F04D715813 | 0.51 | 174 | 264 | 50 |
| 2008-08-01T07:46:59 | MB00D28B | F04D013605 | 0.58 | 182 | 264 | 22 |
| 2008-08-01T07:47:24 | MB00BZEB | F04D70A808 | 0.58 | 180 | 257 | 25 |
| 2008-08-01T07:47:40 | MB00BXMB | F04D701C07 | 0.56 | 175 | 251 | 37 |
| 2008-08-01T07:48:03 | MB00BZ8B | F04D71110B | 0.58 | 179 | 273 | 22 |
| 2008-08-01T07:49:32 | MB00D13B | F04D00E516 | 0.56 | 176 | 239 | 43 |
| 2008-08-01T07:49:51 | MB00BYAB | F04DD05B36 | 0.59 | 175 | 242 | 40 |
| 2008-08-01T07:50:23 | MB00BY7B | F04D713402 | 0.53 | 174 | 254 | 43 |
| 2008-08-01T07:50:24 | MB00D2MB | F04D70A816 | 0.56 | 170 | 245 | 47 |
| 2008-08-01T07:52:11 | MB00D2HB | F04D708528 | 0.57 | 169 | 270 | 31 |
| 2008-08-01T07:52:21 | MB00D0YB | F04D014D33 | 0.52 | 169 | 273 | 40 |
| 2008-08-01T07:52:48 | MB00D1XB | F04D701C16 | 0.55 | 185 | 273 | 25 |
| 2008-08-01T07:54:06 | MB00BYEB | F04DD05B1E | 0.58 | 184 | 273 | 16 |
| 2008-08-01T07:54:19 | MB00D2PB | F04D70EE1B | 0.56 | 183 | 245 | 37 |
| 2008-08-01T07:57:16 | MB00BYBB | F04DD05B2F | 0.55 | 180 | 273 | 25 |
| 2008-08-01T07:57:41 | MB00D35B | F04D00C20F | 0.53 | 185 | 254 | 37 |
| 2008-08-01T08:08:06 | MB00D1RB | F04DD07E2C | 0.59 | 180 | 251 | 28 |
| 2008-08-01T08:10:39 | MB00D0TB | F04D00E507 | 0.54 | 180 | 239 | 47 |
| 2008-08-01T08:10:42 | MB00D0JB | F04DD07E36 | 0.54 | 183 | 254 | 40 |
| 2008-08-01T08:12:47 | MB00D1DB | F04D00652B | 0.57 | 179 | 264 | 28 |
| 2008-08-01T08:54:16 | MB00D23B | F04D70EF2C | 0.54 | 179 | 260 | 34 |
| 2008-08-01T08:55:59 | MB00D2GB | F04DD07E2B | 0.50 | 182 | 254 | 47 |
| 2008-08-01T08:56:19 | MB00D1VB | F04DD0670C | 0.59 | 179 | 288 | 9 |
| 2008-08-01T08:56:56 | MB00D27B | F04D715807 | 0.46 | 181 | 239 | 62 |
| 2008-08-01T08:57:01 | MB00D0EB | F04DD07E34 | 0.54 | 179 | 251 | 43 |
| 2008-08-01T08:57:18 | MB00D10B | F04D006532 | 0.52 | 177 | 236 | 53 |
| 2008-08-01T08:57:20 | MB00D2DB | F04D708529 | 0.56 | 179 | 267 | 28 |
| 2008-08-01T08:57:41 | MB00D16B | F04DD07E26 | 0.58 | 176 | 251 | 34 |
| 2008-08-01T08:57:58 | MB00D1MB | F04DD07E27 | 0.57 | 173 | 245 | 43 |
| 2008-08-01T08:58:01 | MB00BZNB | F04D012526 | 0.58 | 175 | 239 | 47 |
| 2008-08-01T08:59:06 | MB00D02B | F04D01251B | 0.54 | 171 | 257 | 40 |
| 2008-08-01T08:59:29 | MB00D1SB | F04D70CB3A | 0.57 | 173 | 239 | 50 |
| 2008-08-01T08:59:44 | MB00D0NB | F04D715818 | 0.56 | 170 | 248 | 47 |
| 2008-08-01T09:00:28 | MB00D24B | F04D715828 | 0.58 | 167 | 242 | 47 |

FIG. 9

| MANUFACTURING DATE AND TIME | PRODUCT SERIAL NUMBER | PARTS NUMBER | TRACK WIDTH | PRODUCTION YIELD |
|---|---|---|---|---|
| 2008-08-01T09:02:03 | MB00D15B | F04DD07E28 | 164 | 1 |
| 2008-08-01T09:02:23 | MB00D06B | F04D703F1F | 179 | 1 |
| 2008-08-01T09:03:07 | MB00BZ7B | F04D00C22E | 179 | 0 |
| 2008-08-01T09:03:19 | MB00D2ZB | F04DD07E2D | 176 | 1 |
| 2008-08-01T09:04:45 | MB00D19B | F04D713403 | 173 | 1 |
| 2008-08-01T09:05:37 | MB00D0DB | F04D00C227 | 175 | 1 |
| 2008-08-01T09:05:41 | MB00BZ6B | F04D703F09 | 170 | 1 |
| 2008-08-01T09:06:06 | MB00D11B | F04D014813 | 175 | 1 |
| 2008-08-01T09:07:19 | MB00D09B | F04D00C22F | 171 | 0 |
| 2008-08-01T09:07:59 | MB00BY4B | F04DD05B2E | 173 | 1 |
| 2008-08-01T09:09:37 | MB00D12B | F04D006538 | 169 | 0 |
| 2008-08-01T09:10:21 | MB00D2JB | F04D70EE31 | 167 | 1 |
| 2008-08-01T09:10:38 | MB00D38B | F04D70EE1A | 164 | 0 |
| 2008-08-01T09:10:48 | MB00D2BB | F04D70A80D | 167 | 1 |
| 2008-08-01T09:10:49 | MB00D14B | F04D00651F | 171 | 1 |
| 2008-08-01T09:14:43 | MB00D1ZB | F04D701C2A | 163 | 1 |
| 2008-08-01T09:15:31 | MB00BZ0B | F04D71110F | 186 | 1 |
| 2008-08-01T09:15:37 | MB00BXNB | F04D711107 | 187 | 0 |
| 2008-08-01T09:16:51 | MB00BYDB | F05990901D | 187 | 1 |
| 2008-08-01T09:17:11 | MB00BWMB | F04D706239 | 185 | 1 |
| 2008-08-01T09:17:32 | MB00BWPB | F04D005416 | 187 | 1 |
| 2008-08-01T09:18:01 | MB00D1EB | F04D701C29 | 183 | 1 |
| 2008-08-01T09:19:10 | MB00BZXB | F04DD07E23 | 184 | 1 |
| 2008-08-01T09:19:47 | MB00D1HB | F04D006533 | 183 | 1 |
| 2008-08-01T09:21:25 | MB00BZWB | F04D701C2D | 188 | 1 |
| 2008-08-01T09:21:26 | MB00BXZB | F04D71111E | 180 | 1 |
| 2008-08-01T09:21:51 | MB00BWDB | F04D005420 | 179 | 1 |
| 2008-08-01T09:24:03 | MB00BYYB | F04D711105 | 176 | 1 |
| 2008-08-01T09:25:07 | MB00BYRB | F04D703F22 | 178 | 1 |
| 2008-08-01T09:25:18 | MB00BZMB | F04D70CB08 | 174 | 1 |
| 2008-08-01T09:25:23 | MB00BWUB | F04D70A82A | 175 | 1 |
| 2008-08-01T09:25:25 | MB00BYVB | F04D703F21 | 176 | 0 |
| 2008-08-01T09:25:42 | MB00BWYB | F04DD05B13 | 180 | 1 |
| 2008-08-01T09:26:48 | MB00BYUB | F04DD0671C | 177 | 1 |
| 2008-08-01T09:26:57 | MB00BZUB | F04D71112C | 172 | 1 |
| 2008-08-01T09:27:37 | MB00D07B | F04D000E0D | 181 | 1 |
| 2008-08-01T09:27:55 | MB00BYJB | F04D701C26 | 174 | 1 |
| 2008-08-01T09:28:09 | MB00BWSB | F04D000E28 | 179 | 1 |
| 2008-08-01T09:29:35 | MB00BW6B | F04D00542D | 178 | 1 |

Column headers numbered: 1001, 1002, 1003, 1004, 1005

FIG. 10

METHOD AND SYSTEM FOR MANUFACTURING A HARD-DISK DRIVE

CROSS-REFERENCE TO RELATED APPLICATION

This application claims priority from the Japanese Patent Application No. 2008-314521, filed Dec. 10, 2008, the disclosure of which is incorporated herein in its entirety by reference.

TECHNICAL FIELD

Embodiments of the present invention relate to method for manufacturing a hard-disk drive (HDD) including a servo self-writing operation and a system for manufacturing a HDD including means for servo self-writing a HDD.

BACKGROUND

FIG. 1 shows the basic structure of a HDD. When the HDD accesses data on a magnetic-recording disk 101, an arm 102 pivots so as to move a magnetic-recording head 103, which is provided at a front end of the arm 102, in proximity with a target servo track 104. The arm 102 has a structure such that the arm 102 pivots on a pivot axis 105; and, the arm 102 includes a drive mechanism, which is an actuator 106, at a rear end of the arm 102. When the actuator 106 moves the arm 102 to place the magnetic-recording head 103 at the target servo track 104, the position of the magnetic-recording head 103 is detected. For this purpose, a servo sector on the servo track is used.

The servo sector, shown in FIG. 2, includes an address code 201 and a burst signal 202. The servo sectors are radially written on the magnetic-recording disk 101. A servo track number and a serve sector number are recorded in the address code 201 in the form of Gray code. Thus, the position of the magnetic-recording head 103 over the magnetic-recording disk 101 is known. The burst signal 202 is used to control the position of the magnetic-recording head 103 to be accurately at the center of the servo track 104. The method called the 4th burst, shown in FIG. 2, has a structure in which four patterns form a set; and, the boundary of two bursts is defined as a servo track 104.

Among the methods for writing this servo track 104, a method referred to herein by the term of art, "called a self-servo writing," is known in the art, by which servo tracks are written using a magnetic-recording head in a HDD after the HDD is assembled. Engineers and scientists engaged in HDD manufacturing and development are interested in the design of HDDs that employ self-servo writing to provide written servo tracks on the magnetic-recording disk to meet the rising demands of the marketplace for increased data-storage capacity, performance, and reliability.

SUMMARY

Embodiments of the present invention include a method for manufacturing a hard-disk drive. The method for manufacturing a hard-disk drive includes an operation of writing servo tracks by performing self-servo writing, and an operation of writing servo tracks into the hard-disk drive using a calculated control target value of a calculated servo pattern overlap amount. The operation of writing servo tracks includes a first operation, a second operation, a third operation, and a fourth operation. The first operation includes: producing a first control equation for obtaining a servo pattern overlap amount that is used as a control target value during actual servo track writing, from a written servo track pitch, a servo pattern overlap amount that is a control target value at the time of writing, and a magnetic-recording-head characteristic value; arranging a root-mean-square error (RMSE) into series; and, converting the RMSE into a probability distribution. The second operation includes calculating a second control target value of the written servo track pitch that results in an increased product yield, from the written servo track pitch, product defect information, and the RMSE probability distribution. The third operation includes producing a second control equation for obtaining a calculated servo pattern overlap amount for the magnetic-recording-head characteristic value, the calculated servo pattern overlap amount being a calculated control target value for writing a servo track with a calculated servo track pitch, by assigning the second control target value of the servo track pitch into the first control equation. The fourth operation includes calculating the calculated control target value of the calculated servo pattern overlap amount using the second control equation and the magnetic-recording-head characteristic value.

DESCRIPTION OF THE DRAWINGS

The accompanying drawings, which are incorporated in and form a part of this specification, illustrate embodiments of the invention and, together with the description, serve to explain the embodiments of the present invention:

FIG. 3 is a plan view showing the relationship between a servo pattern and a read-back signal read from the magnetic-recording disk, with relevance to embodiments of the present invention.

FIG. 6 is a table showing simulation results using a probability model for track pitch variations in HDDs, in accordance with an embodiment of the present invention.

FIG. 9 is a table showing written servo track pitches that are output to a control equation computing unit, overlap amounts that are the control target values at the time of writing, and magnetic-recording-head characteristic values, in accordance with an embodiment of the present invention.

FIG. 10 is a table showing product defect information and written servo track pitches that are output to a probability model computing unit shown in FIG. 8, in accordance with an embodiment of the present invention.

Figure 1:
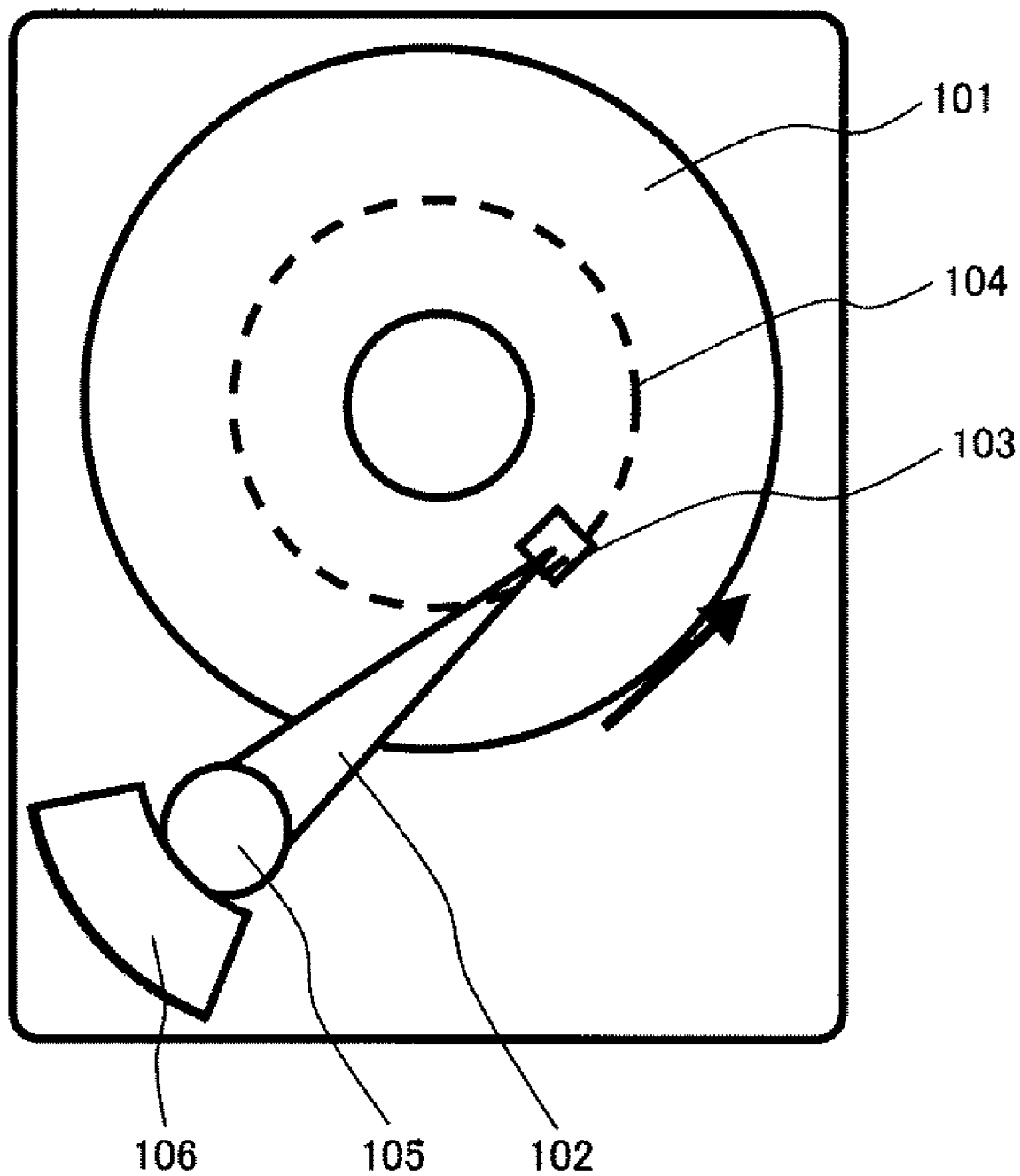
FIG. 1 is a plan view showing the basic structure of a hard-disk drive (HDD), with relevance to embodiments of the present invention.
Figure 2:
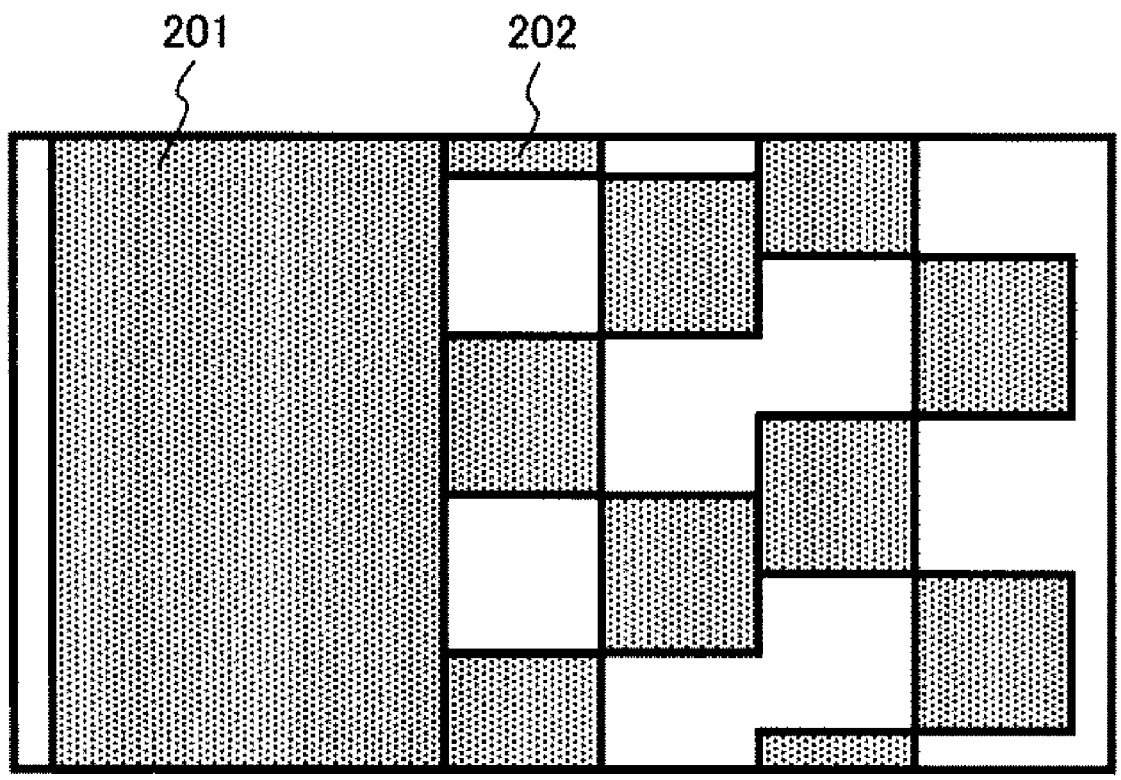
FIG. 2 is a plan view showing a format of a servo sector on a magnetic-recording disk of the HDD of FIG. 1, with relevance to embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Method and a System for Manufacturing a Hard-Disk Drive With relevance to embodiments of the present invention, as is known in the art, an overlap amount may be measured from read-back signals 303 and 304 of a plurality of servo patterns 301 and 302, which are written radially on the magnetic-recording disk by the magnetic-recording head inside the hard-disk drive (HDD), and the next writing position is adjusted, such that a pitch 309 of the servo tracks is controlled, as shown in FIG. 3. At this time, a pitch 309 between the servo pattern 301 and the servo pattern 302 can be represented by the following equation (1):

$$TW = RW + SQ - (1 - a/b)RW \qquad (1)$$

For equation (1), TW is the pitch 309 between the servo patterns 301 and 302; RW is a read width indicated by a side 307 of a triangle formed when approximating the read-back signal 304 to a trapezoid; SQ is a squeeze amount indicated by a short side 305 formed when approximating the read-back signal 304 to the trapezoid; a is an intercept 307 of the read-back signal 303 of the servo pattern 301 at a center 306 of the read-back signal 304; and b is an intercept 308 of the read-back signal 304 of the servo pattern 302 at the center 306 of the read-back signal 304. Here, the value a/b is defined as an overlap amount used for the process control in the servo track writing operation. As used herein, the terms of art "reading width" and "read width" are identified one with the other and refer to the same entity.

At this time, however, the read-back signals 303 and 304 used for calculating the track pitch are values obtained by measuring the signal written by the write element of the magnetic-recording head 103 inside the HDD with the use of the read element of the magnetic-recording head 103 inside the HDD; and therefore, the read-back signals 303 and 304 are affected by the sizes of the write and read elements, which are different from one magnetic-recording head to another. For this reason, as is known in the art, the pitch of servo tracks cannot be controlled in absolute value; and, the pitch and the radial direction linearity of the finally written servo tracks vary from one HDD to another. In the case where the pitch of servo tracks vary from one HDD to another, reading defects may arise in the combinations of reading and writing widths, resulting from the different element sizes from one magnetic-recording head to another.

In order to address this issue, the method is also known in the art that uses a method in which a first servo track is written in a radial position of a magnetic-recording disk in a first operation and a second servo track is written in a second operation. In this method, the second servo track is written based on the first servo track, so a correction is made when writing the second servo track from the information of the first servo track so as to correct the servo track pitch and the linearity in the radial direction when writing the second servo track. In this method, however, since writing is performed two times, twice the manufacturing time is utilized as compared with the method with one time writing. As a consequence, as magnetic-recording density has improved and the number of servo tracks has increased with the advance of HDD technology, the double writing method entails an increasing amount of manufacturing cost and equipment investment in comparison with the method of writing one time, because the manufacturing time increases by the square of the number of tracks.

In view of this, another method is known in the art that changes the method for double writing to a one-time writing method. In this method, magnetization widths of magnetic-recording heads are classified, and an appropriate pitch of servo signals is obtained experimentally for each of the classifications. The obtained pitch is given as a manufacture condition. However, this method utilizes a manufacturing operation of selecting and assembling the magnetic-recording heads. Therefore, the manufacturing cost may increase because of the increase in the number of manufacturing operations; and, the utilization efficiency of the magnetic-recording heads may decrease because of the selection performed on magnetic-recording heads. In addition, if the number of classifications is increased for the purpose of increasing the control accuracy of the number of tracks, the use efficiency of the magnetic-recording heads may be further lowered; and, the product yield of the magnetic-recording heads may decrease.

Embodiments of the present invention identify a track pitch with a low percentage of defective HDDs before writing with the self-writing method for servo tracks so that product yield is increased, as may occur with a reduction in read errors resulting from the written track pitch. Moreover, embodiments of the present invention write servo tracks by obtaining the manufacture conditions of the self-writing method for each HDD of a plurality of HDDs so that the track pitch can be written as close to the identified track pitch with a low percentage of defective HDDs.

In accordance with embodiments of the present invention, a method for manufacturing a hard-disk drive includes an operation of writing servo tracks by performing self-servo writing. The operation of writing servo tracks includes:

an operation including obtaining a control target value of a written servo track pitch that results in an increased product yield from a relationship between written servo track pitches and post-process product yields, using a probability model;

an operation including: using a multiple regression analysis for predicting a written track pitch from a magnetic-recording-head characteristic value measured before assembling a HDD and an overlap amount used for process control in a servo track writing process of a self-writing method, producing a control equation for obtaining an overlap amount for the magnetic-recording-head characteristic value such that the overlap amount is a control target value for writing a servo track with a servo track pitch; and, an operation including calculating a calculated servo pattern overlap amount for writing a servo track with a calculated servo pitch such that the calculated servo pattern overlap amount is a calculated control target value for an individual HDD placed into a servo track writing device, using the control equation, and feeding the calculated servo pattern overlap amount back to the device as a manufacture condition.

In accordance with embodiments of the present invention, a system for manufacturing a HDD includes:

a manufacturing database for storing product defect information, a written servo track pitch, a servo pattern overlap amount that is a control target value at the time of writing, and a magnetic-recording-head characteristic value of a HDD, based on a production history;

a model computing unit including: a control equation computing unit for producing a first control equation for obtaining a servo pattern overlap amount used as a control value during actual servo track writing, from the written servo track pitch, the servo pattern overlap amount that is the control target value at the time of writing, and the magnetic-recording-head characteristic value, arranging root-mean-square error (RMSE) into series, and converting the RMSE into a probability distribution; and, a probability model computing unit for producing a second control equation by calculating a second control target value of a written servo track pitch that results in an increased product yield from the product defect information, the written servo track pitch, and the RMSE probability distribution, and for obtaining a calculated servo pattern overlap amount for the magnetic-recording-head characteristic value such that the calculated servo pattern overlap amount is a calculated control target value for writing a servo track with a calculated servo track pitch, by assigning the second control target value into the first control equation;

a writing control database for receiving and storing the second control equation from the model computing unit, for receiving and storing the magnetic-recording-head characteristic value from the manufacturing database, for receiving a product serial number and product information used for servo track writing such as a magnetic-recording-head number of a currently-equipped HDD from a servo self-writing device, for selecting the second control equation corresponding to the product information, for selecting the magnetic-recording-head characteristic value corresponding to the product information and the selected second control equation, and for calculating for the product information a calculated control target value of said calculated servo pattern overlap amount; and a servo self-writing device for writing servo tracks into a currently-equipped HDD using the calculated control target value of said calculated servo pattern overlap amount.

Figure 8:
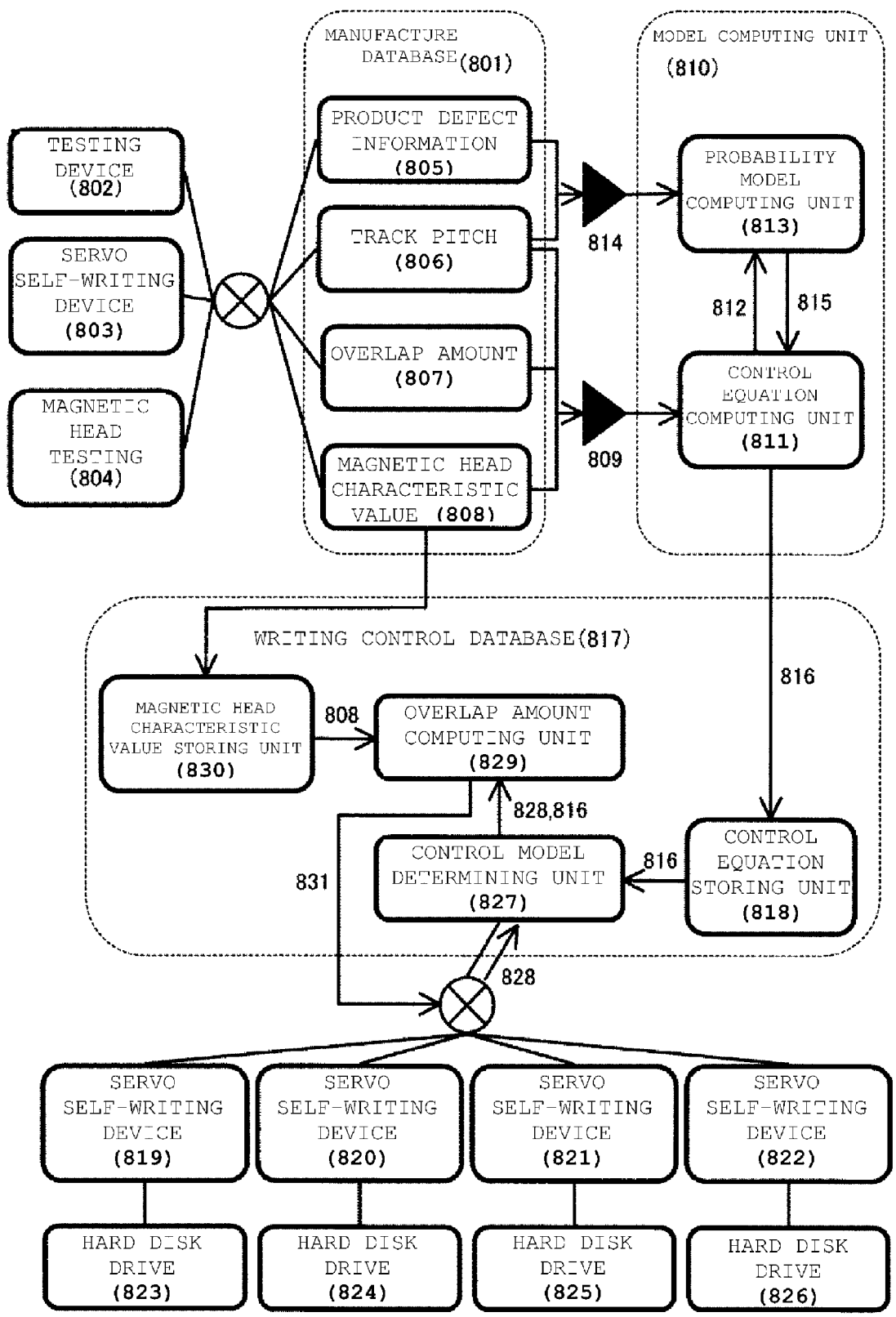
FIG. 8 is a block diagram of a system for manufacturing a HDD, in accordance with an embodiment of the present invention.

In accordance with embodiments of the present invention, a servo track with a servo track pitch written by a self-writing method is controlled to be a value that increases production yield for manufactured HDDs. In accordance with embodiments of the present invention, a method for manufacturing a HDD and a system for manufacturing the HDD are subsequently described in detail with reference to the drawings. In accordance with embodiments of the present invention, a block diagram of the system for manufacturing the HDD is shown in FIG. 8. Before describing the system, the constituent components of the system are next described.

Figure 4:
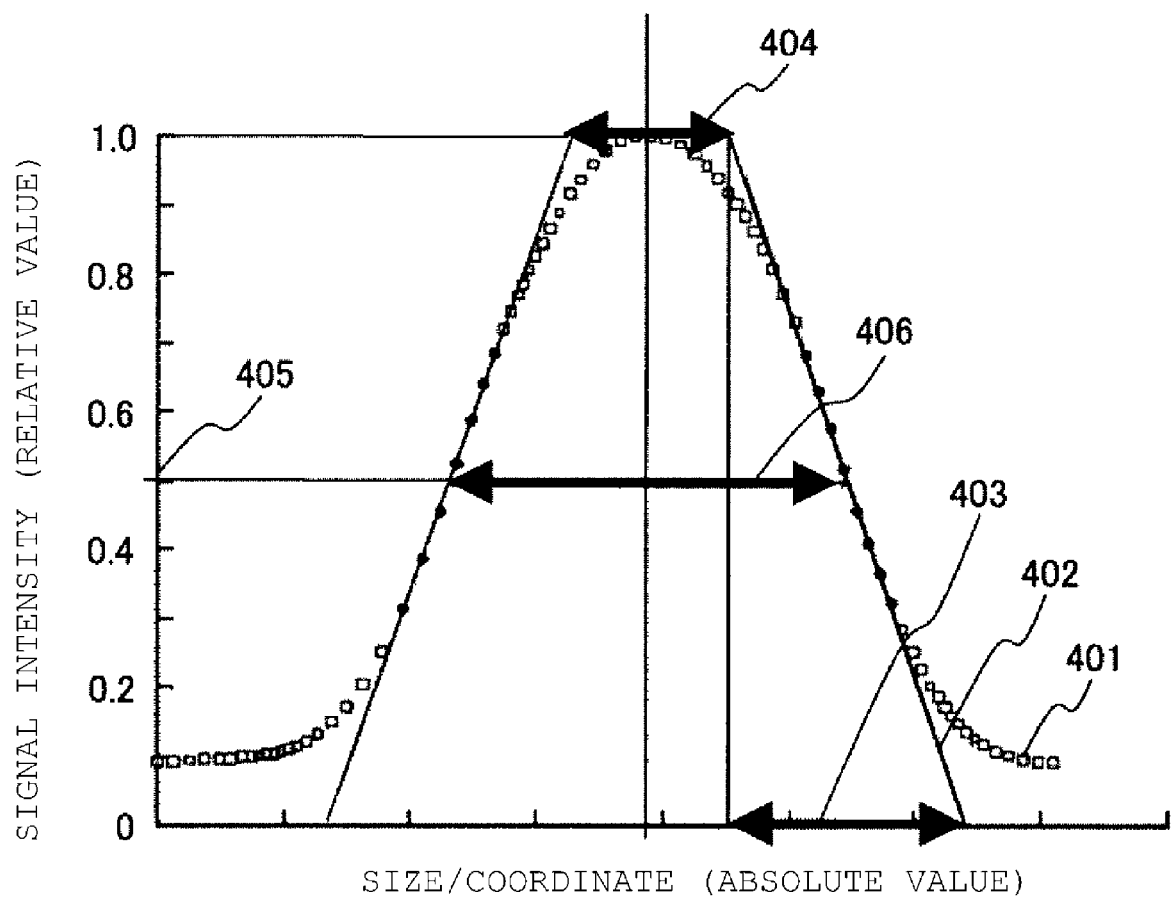
FIG. 4 is a schematic view of a read-back signal read from the magnetic-recording disk, in accordance with an embodiment of the present invention.

With reference now to FIG. 4, in accordance with an embodiment of the present invention, a schematic view is shown of the read-back signal 401. This embodiment includes a testing process of measuring a characteristic value of a magnetic-recording head before assembling a HDD. As used herein, the terms of art "magnetic-recording-head characteristic value" and "magnetic head characteristic value" are identified one with the other and refer to the same entity. In this process, a read-back signal 401, which a distribution of readback signal intensity when a pattern written by the write element of the magnetic-recording head is measured while changing the position of the magnetic-recording-head read element, is measured, as shown in FIG. 4. Here, the size of the horizontal axis is measured as absolute value using a physical, or optical, external reference length-measuring device. In addition, the measurement error resulting from the magnetization characteristic of the magnetic-recording disk can be corrected by performing correction with a standard sample.

In addition, the shape of the read-back signal 401 is approximated to a trapezoid 402, and a read width 403 and a squeeze amount 404 used in the overlap amount calculation equation (1) are measured. The squeeze amount 404 can be obtained by subtracting the read width 403 from a writing width 406 indicated by an intercept 405 at a signal intensity of 0.5 where the maximum signal intensity obtained by approximating the shape of the read-back signal to a trapezoid is 1. Therefore, at this time, the writing width 406 is measured instead of the squeeze amount. When servo tracks are written with combining writing and erasure of a pattern, an overwrite characteristic value is measured, which is the remaining signal amount after erasure of the pattern. Moreover, the magnetic characteristic values of the magnetic-recording head such as and the main magnetic pole size and the error rate of the magnetic-recording head, which affect writing of servo tracks, are measured.

These characteristic values of the magnetic-recording heads are measured with a magnetic-recording-head testing device, and the characteristic values are stored via a network in a manufacturing database in a unit of the product serial number of the magnetic-recording head, or alternatively, the part number of a combination of the magnetic-recording head and the arm. As used herein, the terms of art "manufacturing database" and "manufacture database" are identified one with the other and refer to the same entity.

Moreover, in this embodiment, a control target value of a written track pitch that results in an increased product yield is obtained from the relationship between written track pitches and post-process product yields, by a simulation using a probability model.

Figure 5:
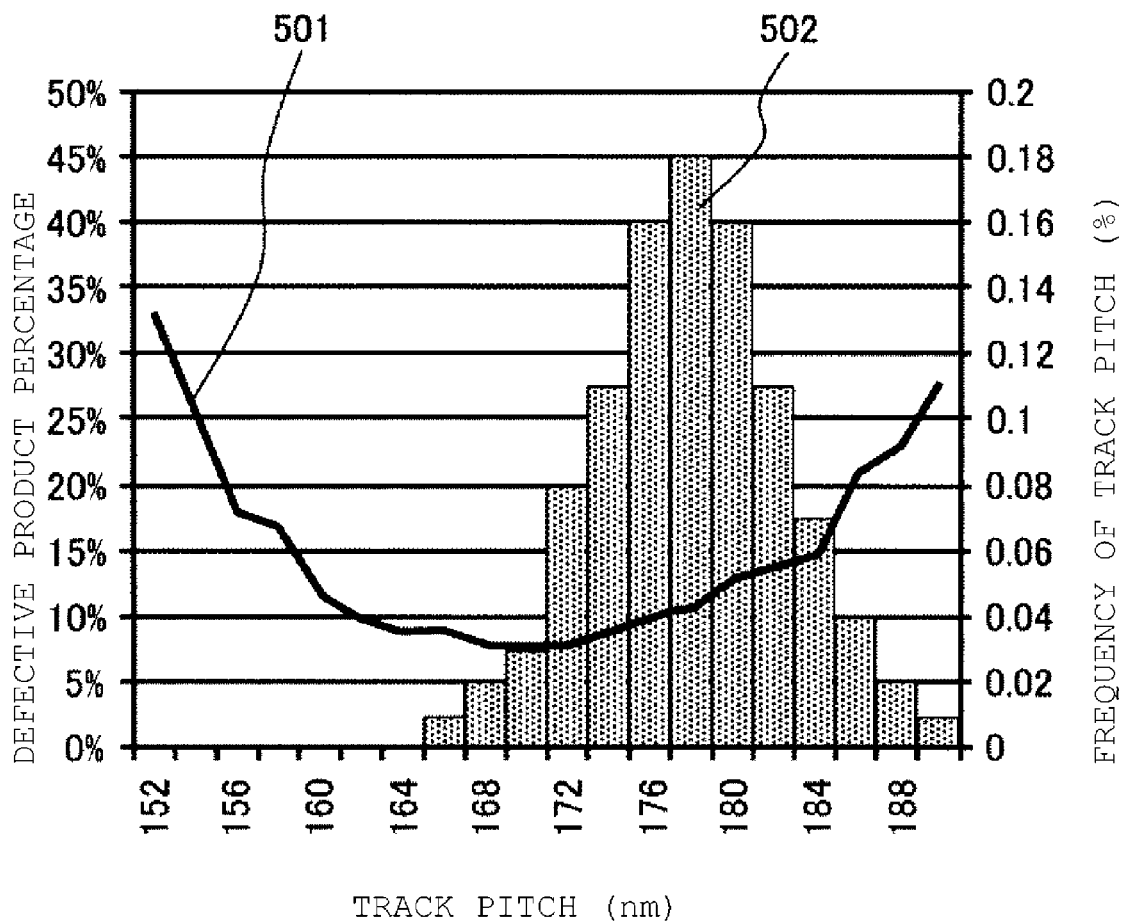
FIG. 5 is a graph showing defective product percentage and frequency distribution of track pitch versus track pitch, in accordance with an embodiment of the present invention.

With reference now to FIG. 5, in accordance with an embodiment of the present invention, a graph is shown that shows defective product percentage of HDDs versus track pitch is indicated by a line 501, and frequency distribution of written track pitch is indicated by a histogram 502. A HDD shows poor position control accuracy for the magnetic-recording head when the track pitch is too wide. Conversely, when the track pitch is too narrow, interference with adjacent tracks occurs during reading and writing and read error increases. As a consequence, the percent defective for HDDs shows a U-shaped curve like the line 501. On the other hand, in the servo track writing of the self-writing method, variations of the track pitch originating from the variations of magnetic characteristic values of the magnetic-recording head used at the time of writing arise as shown in the histogram 502. Therefore, some of the HDDs may be produced in a region in which the percent defective is high.

With reference now to FIG. 6, in accordance with an embodiment of the present invention, a table is shown that shows simulation results using a probability model for track pitch variations in HDDs. Accordingly, in this embodiment, an optimum number of tracks is decided by a simulation using the probability model shown in FIG. 6. Here, the probability model is such that the track pitches collected from past manufacturing data are arranged into series, like series lower limits 601 and a series upper limits 602 in FIG. 6, and the product defects of HDDs in each of the series are defined by a defective product percentage 603.

In the simulation, track pitch variations of HDDs are defined for this probability model in probability distribution and arranged from a distribution A 604 to a distribution H 611 for varied track pitch target values 612.

Here, the percent defective expected value 613, which is the number obtained by adding up the products of the defective product percentages and the probability distributions in the same series, may be regarded as the average percent defective when servo tracks are written with the track pitch target value 612.

In the example of FIG. 6, the percent defective expected value for the distribution A 604 at the track pitch target value 179 nanometers is 11.7%, which can be converted into a product yield of 88.3%. A distribution B 605 is a distribution in which the probability distribution of the distribution A 604 is shifted upward by one series, and the track pitch target value is 177 nanometers. This means that the track pitch target value is decreased by 2 nanometers. The percent defective expected value at this time is 10.7%, which is lower by 1% than the percent defective in the distribution A.

Thus, the track pitch target value is obtained that can result in the lowest percent defective expected value by repeatedly performing the process of varying the track pitch target value for the defined probability distribution and calculating the percent defective expected value, as from the distribution A to distribution H.

In addition, this embodiment includes an operation of producing a multiple regression model for predicting a written track pitch from a magnetic-recording-head characteristic value measured before assembling a HDD and an overlap amount used for process control in a servo track self-writing process, and producing a control equation for obtaining, for the magnetic-recording-head characteristic value, an overlap amount for writing up the tracks so as to be a track pitch control target value.

In the method known in the art, as shown in FIG. 3, the servo track pitch 309 is controlled by measuring the overlap amount from the read-back signals 303 and 304 of a plurality of servo patterns 301 and 302 written radially on a magnetic-recording disk by the magnetic-recording head inside the HDD, and adjusting the next writing position. At this time, the pitch 309 between the servo pattern 301 and the servo pattern 302 can be represented by the following equation (1):

$$TW=RW+SQ-(1-a/b)RW \tag{1}$$

For equation (1), TW 309 is the pitch between the servo patterns 301 and 302; RW is a read width indicated by the side 307 of one side of a triangle formed when approximating the read-back signal 304 to a trapezoid; SQ is a squeeze amount indicated by the short side 305 formed when approximating the read-back signal 304 to the trapezoid; a is the intercept 307 of the read-back signal 303 of the servo pattern 301 at the center 306 of the read-back signal 304; and, b is the intercept 308 of the read-back signal 304 of the servo pattern 302 at the center 306 of the read-back signal 304. Here, the value a/b is defined as an overlap amount used for the process control in the servo track writing operation.

However, equation (1) is a theoretical equation; therefore, to perform manufacturing using this equation, measurement and control errors are corrected. Accordingly, equation (2), in which correction factors are added to equation (1), is used:

$$TW=\alpha(RW+SQ-(1-a/b)RW)+\beta \tag{2}$$

To obtain the correction factors $\alpha$ and $\beta$, equation (2) is expanded into equation (3):

$$TW=\alpha(SQ+(a/b)RW)+\beta \tag{3}$$

Correction factors $\alpha$ and $\beta$ can be obtained by using an experiment or a statistical technique for this equation (3). However, with this equation, control accuracy may be limited, because the correction factors cannot be set independently for the squeeze amount and the read width; correction factors for the magnetic-recording-head characteristic values that are known to affect the track pitch cannot be defined, such as: overwrite characteristic value, main magnetic pole size, and error rate; and, the relationship between overlap amount and track pitch is not linear.

In view of this, in this embodiment of the present invention, the read width 403 and the squeeze amount 404 that are measured based on FIG. 4, the magnetic characteristic values of the magnetic-recording head such as the overwrite characteristic value, the main magnetic pole size, and the error rate, and the overlap amount used for process control in the servo track writing process are all handled as independent terms; and, the coefficients and intercepts for the respective terms are obtained by multiple regression analysis. This relationship can be expressed as multiple regression equation (4):

$$TW=\alpha 1 \cdot (a/b) + \alpha 2 \cdot RW + \alpha 3 \cdot SQ + \alpha 4 \cdot OW + \alpha 5 \cdot MC + \alpha 6 \cdot ER + \beta \tag{4}$$

For equation (4), TW represents the track pitch; RW represents the read width; SQ represents the squeeze amount; OW represents the overwrite characteristic value; MC represents the main magnetic pole size; ER represents the error rate; $\alpha 1$-6 are the coefficients relating to the respective terms; and, $\beta$ is the intercept. Among these, the read width, the squeeze amount, and the overlap amount are main parameters, while the remainder, i.e., the overwrite characteristic value, the main magnetic pole size, the error rate, and so forth, function as correction factors.

Figure 7:
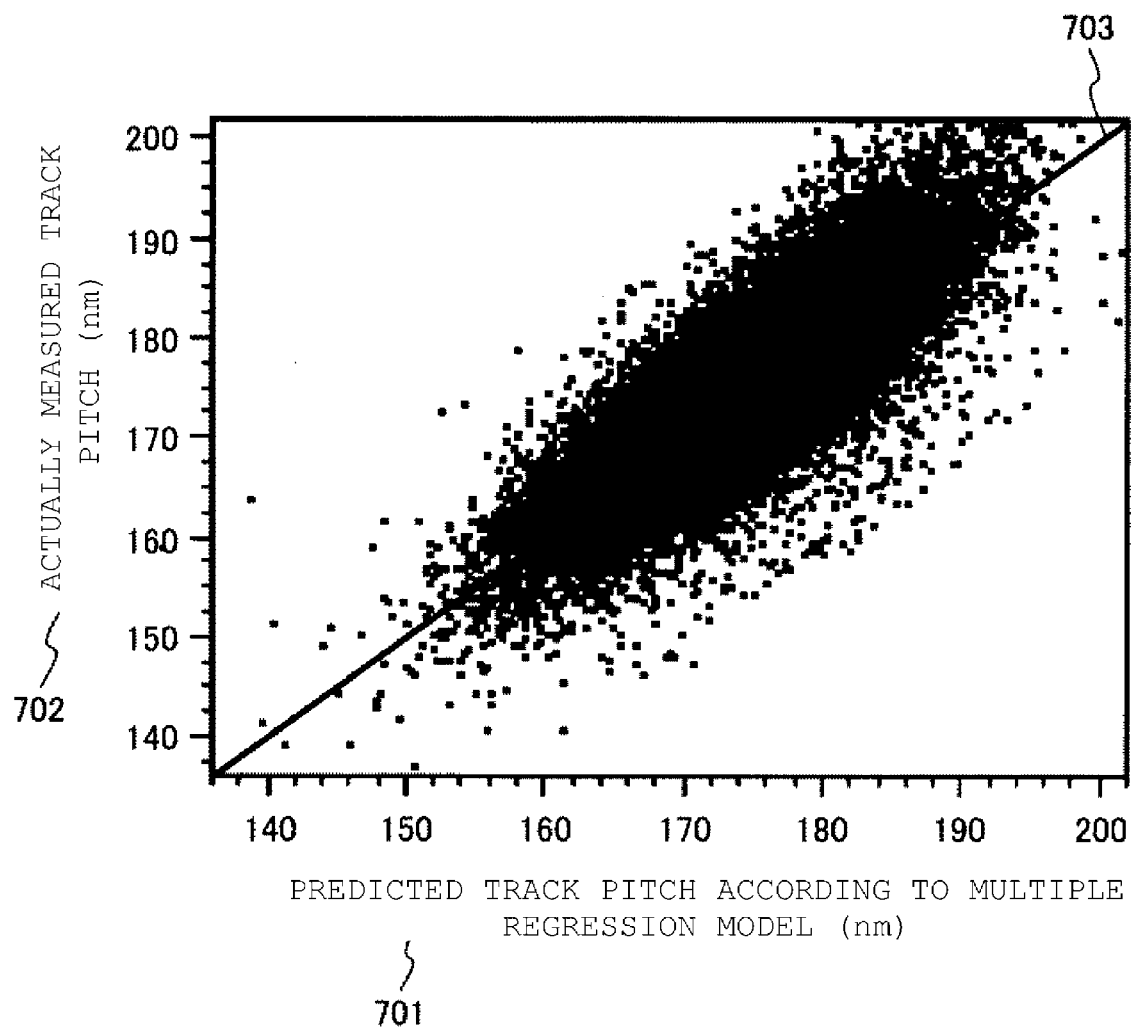
FIG. 7 is a scatter-chart of experiment results showing predicted servo track pitch according to a multiple regression equation and actually measured track pitch after writing, in accordance with an embodiment of the present invention.

With reference now to FIG. 7, in accordance with an embodiment of the present invention, a scatter-chart is shown that shows the experiment results of predicted track pitches 701 obtained by multiple regression equation (4) and actually measured track pitches 702 after writing the servo tracks. When the accuracy of the multiple regression prediction is high, the relationship between the prediction and the actual measurement converges to a relationship 703, where Y=X. The accuracy is represented by an indicator RMSE, which is about 3 nanometers in the example of FIG. 7. This indicates that a track pitch of 1$\sigma$ falls within a range 3 nanometers (nm) above and below the control target value.

In addition, the distribution of RMSE can be used when making a test calculation for the track pitch control target value because the track pitch control target value becomes a predicted value of the track pitch variation when controlling the track pitch using multiple regression equation (4). At that time, the average and distribution of the calculated value of RMSE or the actual distribution is used.

Equation (4) obtained by multiple regression analysis is converted into equation (5), so that the overlap amount (a/b) used as the control value during actual servo writing can be obtained for each magnetic-recording head:

$$(a/b) = \{TW - (\alpha 2 \cdot RW + \alpha 3 \cdot SQ + \alpha 4 \cdot OW + \alpha 5 \cdot MC + \alpha 6 \cdot ER + \beta)\}/\alpha 1 \quad (5)$$

In this embodiment, this equation (5) is produced from the magnetic characteristic values of magnetic-recording heads accumulated in the manufacturing database, the overlap amounts used during servo track writing with the use of the magnetic-recording heads, and the track pitch data that has been written up after servo track writing.

This method increases the control accuracy by adding the test values measured in the magnetic-recording-head testing and other manufacturing processes to the multiple regression equation. At that time, the subject parameters are the parameters that have correlation with the errors between the predicted values of the multiple regression equation and the actually measured values.

In addition, this embodiment of the present invention includes an operation of calculating an overlap amount control target value for writing up servo tracks so as to be a track pitch target value using the above-described control equation, individually for a HDD placed into a servo track writing device, and feeding the overlap amount control target value back to the device as a manufacturing condition.

When using the multiple regression equation, which is a linear equation, for calculating the overlap amount control target value, the calculation error may increase and the control accuracy may degrade if the same calculation equation is used for a long time, in the case where the relationship of the track pitch versus the overlap amount and the magnetic characteristic values of the magnetic-recording head is non-linear and in the case where parameters that affect the track pitch are not measured in magnetic-recording-head testing. Moreover, in an embodiment of the present invention, in the case where the control equations for written track pitch are different depending on the differences of the types of components such as magnetic-recording disks, different control equations are produced for different types of components; and, the different types of components are managed individually. In an embodiment of the present invention, to resolve these issues, a system is provided in which a plurality of control equations are managed respectively for the product types, or part numbers; and, the control equations are reviewed periodically. A system configuration and a flow of servo track writing in a HDD manufacturing method that achieves the foregoing is next described.

With reference now to FIG. 8, in accordance with an embodiment of the present invention, a block diagram of a system for manufacturing a HDD is shown that uses the above-described element technique. A manufacturing database 801 is connected to a magnetic-recording disk testing device 802, a servo self-writing device 803, and a magnetic-recording-head testing device 804 via a network. The manufacturing database 801 stores data of product defect information 805 from the magnetic-recording disk testing device 802, data of written servo track pitches 806 and servo pattern overlap amounts 807 during writing from the servo self-writing device 803, and data of magnetic-recording-head characteristic values 808 from the magnetic-recording-head testing device 804.

In the manufacturing database 801, the magnetic-recording-head characteristic values 808 are stored in a unit of the product serial number of the magnetic-recording head, or alternatively, in the part number of a combination of the magnetic-recording head and the arm. The product defect information 805, the written servo track pitch 806, and the servo pattern overlap amount 807 that is the control target value at the time of writing, are recoded in a unit of HDD product serial number.

In the manufacturing database 801, first, the data of the magnetic-recording-head characteristic value 808, which is recorded in a unit of the product serial number of the magnetic-recording head, or alternatively, the part number of a combination of the magnetic-recording head and the arm, are combined with the data of the written servo track pitch 806 and the overlap amounts 807 that is the control target value at the time of writing, which are recorded in a unit of the HDD product serial number, based on the production history. An output example of the combined data 809 is shown in FIG. 9, as is next described.

With reference now to FIG. 9, in accordance with an embodiment of the present invention, a table is shown that shows written servo track pitches that are output to a control equation computing unit, overlap amounts that are the control target values at the time of writing, and magnetic-recording-head characteristic values. As shown in FIG. 9, manufacturing date and time 901 are used for identifying the subject period for producing a model. A product serial number 902 is used for identifying the product type or product specification and classifying the models to be produced. A parts number 903 is used for classifying the models depending on the differences in components combination. An overlap amount 904, a track width 905, a read width 906, and a squeeze amount 907 are parameters for creating a control model using multiple regression analysis. When the characteristic values of the magnetic-recording head, such as an overwrite characteristic value, a main magnetic pole size, an error rate, are added as correction factors, corresponding columns are added as data to the table.

The output data 809 are sent to a control equation computing unit 811 of a model computing unit 810. In the control equation computing unit 811, equation (4) obtained by multiple regression analysis is converted to produce equation (5) in servo track writing. In addition, a RMSE distribution 812 that can be calculated at the same time is sent to a probability model computing unit 813.

The probability model computing unit 813 creates a probability model shown in FIG. 6 using the method described with reference to FIG. 5. The probability model computing unit 813 receives from the manufacturing database 801 the data 806 of the written track pitch, which is the result of the servo track writing, and the product defect information 805, in the form of data 814 of a HDD product serial number.

With reference now to FIG. 10, in accordance with an embodiment of the present invention, a table is shown that shows product defect information and written servo track pitches that are output to the probability model computing unit shown in FIG. 8. An example of the output from the manufacturing database is shown in FIG. 10. As shown in FIG. 10, manufacturing date and time 1001 are used for identifying the subject period for producing a model. A product serial number 1002 is used for identifying the product type or product specification and classifying the models to be produced. A parts number 1003 is used for classifying the models depending on the differences in components combination. A track width 1004 is used for deciding the series lower limit 601 and the series upper limit 602 of FIG. 6 and for specifying which of the series each of the magnetic-recording disks should be classified into. A production yield 1005 is used when calculating the product yield in each series and calculating the defective product percentage 603 of FIG. 6. In the production yield 1005 of FIG. 10, a good product is denoted by "1", and a defective product is denoted by "0". In this example, the defective product percentage in each series can be calculated as the average of the production yield 1005 for each series.

For a table of the series lower limits 601, the series upper limits 602, and the defective product percentages 603 prepared in this manner, the RMSE distribution 812 calculated by the control equation computing unit 811 is applied to the distribution A 604 of FIG. 6, and the control target value of the written track pitch that results in the increased product yield is calculated according to the method described with reference to FIG. 5. This track pitch control target value 815 is returned to the control equation computing unit 811 and assigned to the track pitch TW of equation (5). Thereby, control equation (6) is produced, for obtaining a overlap amount for writing a servo track with a servo track pitch, such that the overlap amount is the control target value for the magnetic characteristic test value of a magnetic-recording head.

$$(a/b) = \{TTW - (\alpha 2 \cdot RW + \alpha 3 \cdot SQ + \alpha 4 \cdot OW + \alpha 5 \cdot MC + \alpha 6 \cdot ER + \beta)\}/\alpha 1 \quad (6)$$

For equation (6), TTW is the control target value 815 for the written track pitch that results in increased product yield. The obtained control equation 816 is sent to a control equation storing unit 818 in a writing control database 817.

Servo self-writing devices 819, 820, 821, and 822 are connected respectively to HDDs 823, 824, 825, and 826 in a one-to-one relationship. The servo self-writing devices 819, 820, 821, and 822 are connected to the writing control database 817 via a network.

The servo self-writing devices 819, 820, 821, and 822 send the product serial numbers and product information 828, such as the magnetic-recording-head numbers used for servo track writing, of the currently-equipped HDDs 823, 824, 825, and 826 to a control model determining unit 827 of the writing control database 817.

The control model determining unit 827 selects the control equation 816 that matches each of the product information 828 from the control equation storing unit 818 and sends the product information 828 and the control equation 816 to an overlap amount computing unit 829.

The overlap amount computing unit 829 selects a magnetic-recording-head characteristic value 808 that corresponds to the product information 828 and the selected control equation 816 from a head characteristic value database 830 copied from the manufacturing database 801, and calculates an overlap amount control target value 831 for each of the product information 828.

The calculated overlap amount control target value 831 is returned to the servo self-writing devices 819, 820, 821, and 822 via the network.

The servo self-writing devices 819, 820, 821, and 822 write servo tracks into the currently-equipped HDDs 823, 824, 825, and 826 using the overlap amount control target value 831 returned from the writing control database 817.

Figure 11:
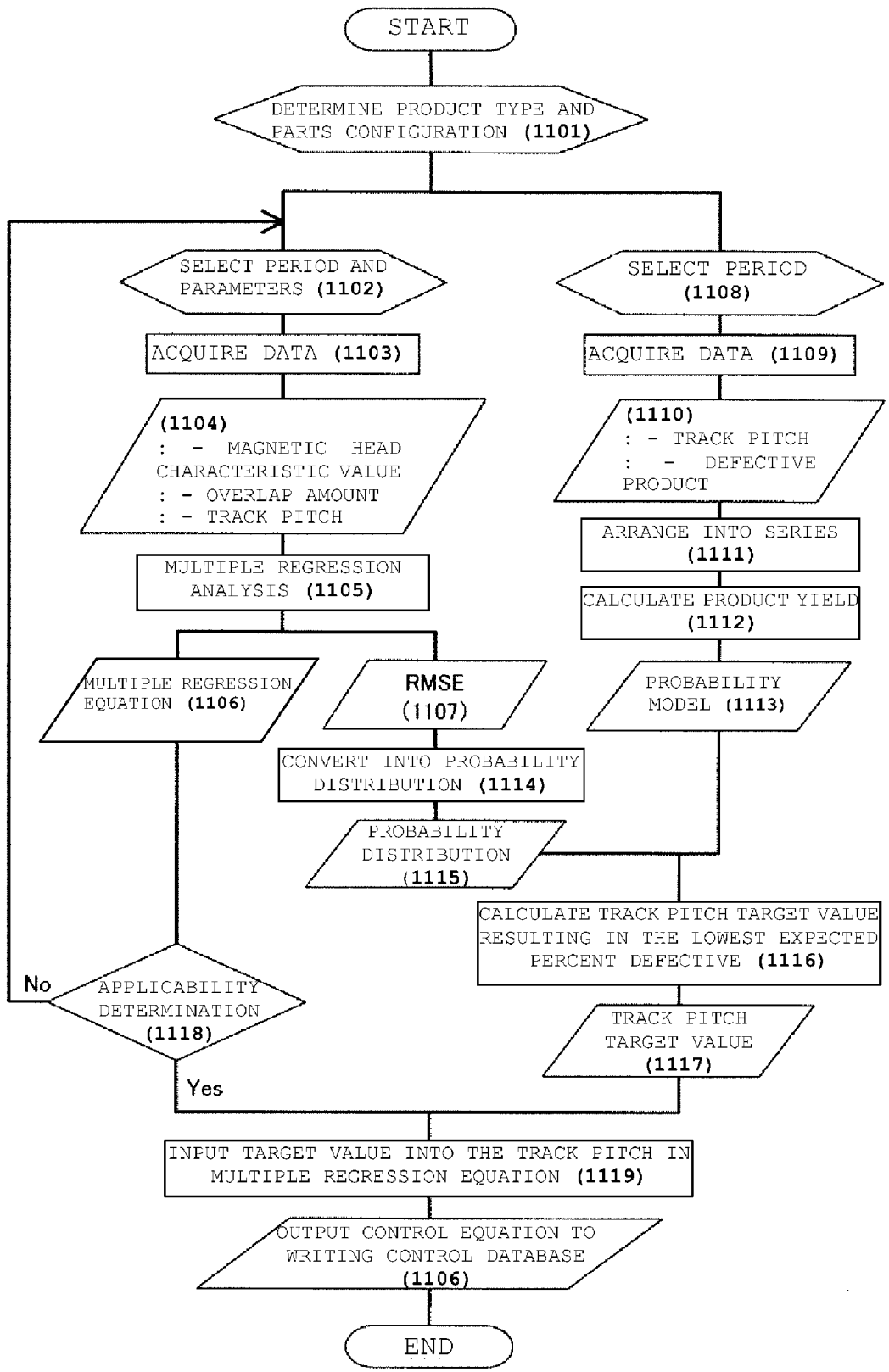
FIG. 11 is a flowchart showing a process of a model computing unit shown in FIG. 8, in accordance with an embodiment of the present invention.

With reference now to FIG. 11, in accordance with an embodiment of the present invention, a flowchart is shown that shows the above-described process in the model computing unit 810 shown in FIG. 8. In a pre-process 1101, the model computing unit first selects which of the product type, or the components' configuration, that a model is to be created for. The unit for creating the model is dependent on the difference in the product design and components combination.

Next, in a pre-process 1102, the model computing unit decides a subject period for creating a multiple regression model and parameters used at that time. At this time, all the magnetic-recording-head characteristic values measured in the head testing process become the subject; and, the head fitting balance measured in an assembling process, or similar data, may also be the subject. As a method for narrowing down the number parameters that are effective, techniques such as parametric testing and correlation analysis exist. However, in this embodiment of the present invention, the read width and the squeeze amount are identified experimentally as the most dominant parameters. Therefore, correction factors are decided by performing a correlation analysis between the prediction error of the multiple regression equation produced with the read width and the squeeze amount and other parameters, and assigning priorities to the read width and the squeeze amount and other parameters in descending order of the correlation coefficient.

Next, in a process 1103, the model computing unit 810 acquires, from the manufacturing database 801, combined data 1104 of the magnetic-recording-head characteristic value, the written servo track pitch, and the overlap amount, corresponding to the period, the product type, and the components' configuration defined in the pre-operations 1101 and 1102. An example of the data 1104 is shown in FIG. 9.

Next, in a process 1105, the model computing unit 810 subjects the data obtained in the process 1104 to a multiple regression analysis. The results that are output by the multiple regression analysis are a multiple regression equation 1106 and a RMSE distribution 1107.

Also, in a process 1109, the track pitch data and the product defect information are acquired that correspond to the product type and the components' configuration identified in the pre-process 1101, and the subject period identified in the pre-process 1108. At this time, the subject period need not be the period specified in the process 1102; but, the data are for a period as long as possible and the track pitch is distributed over a wide range, in order to increase the prediction accuracy. Moreover, the data of the influence of the start of the production and the track pitch on the product yield may be acquired by performing an experiment. An example of the data 1110 is shown in FIG. 10.

Next, in a process 1111, the model computing unit 810 arranges the data 1110 into series. The series produced at this time is produced at an equal pitch using a unit of track pitch. At this time, the number of the HDDs within one series is not lower than 50. When a series with less than 50 HDDs arises, the division unit of the series is increased, or is defined on a model that the series is not used. The series produced here are output as the series lower limit 601, and the series upper limit 602 of FIG. 6.

Next, in a process 1112, the model computing unit 810 calculates the product yield in each series produced in the process 1111 from the product defect information, and assigns a product yield to each respective series, as, for example, the defective product percentage 603 in FIG. 6. This table is output as a probability model 1113.

Next, in a process 1114, the model computing unit 810 arranges a RMSE 1107 that is output as a result of the process 1105 into series, and converts the RMSE into a probability distribution 1115. At this time, the division unit for the series must be the same as in the process 1111.

This probability distribution 1115 is a deviation from the target value that is expected when performing servo track writing according to the multiple regression equation 1106. Thus, in a process 1116, this probability distribution 1115 is assigned to the probability model 1113, and a track pitch target value 1117 that results in the lowest percent defective is obtained by numerical simulation in the method described with reference to FIG. 5.

In addition, at determination 1118, a determination is made as to whether the multiple regression equation 1106 that is output as the result of the process 1105 is applicable to volume production. At this time, the indicator for the determination may be the correlation coefficient and the RMSE obtained from the correlation between the predicted track pitch according to the multiple regression model and the actually written track pitch shown in FIG. 7 as the reference. If this does not satisfy the control target value, the process returns to the process 1102 and the model is produced again.

In a process 1119, the track pitch target value 1117 resulting in the lowest percent defective, which is calculated in the process 1116, is assigned as a track pitch control target value into the multiple regression equation 1106 that is determined as applicable at the determination 1118. Thus, the equation becomes a control equation 1120 for calculating an overlap amount from the characteristic value of the magnetic-recording head. This relationship is expressed in equation (6). The calculated control equation 1120 is stored in the control equation storing unit 818 of the writing control database 817.

Figure 12:
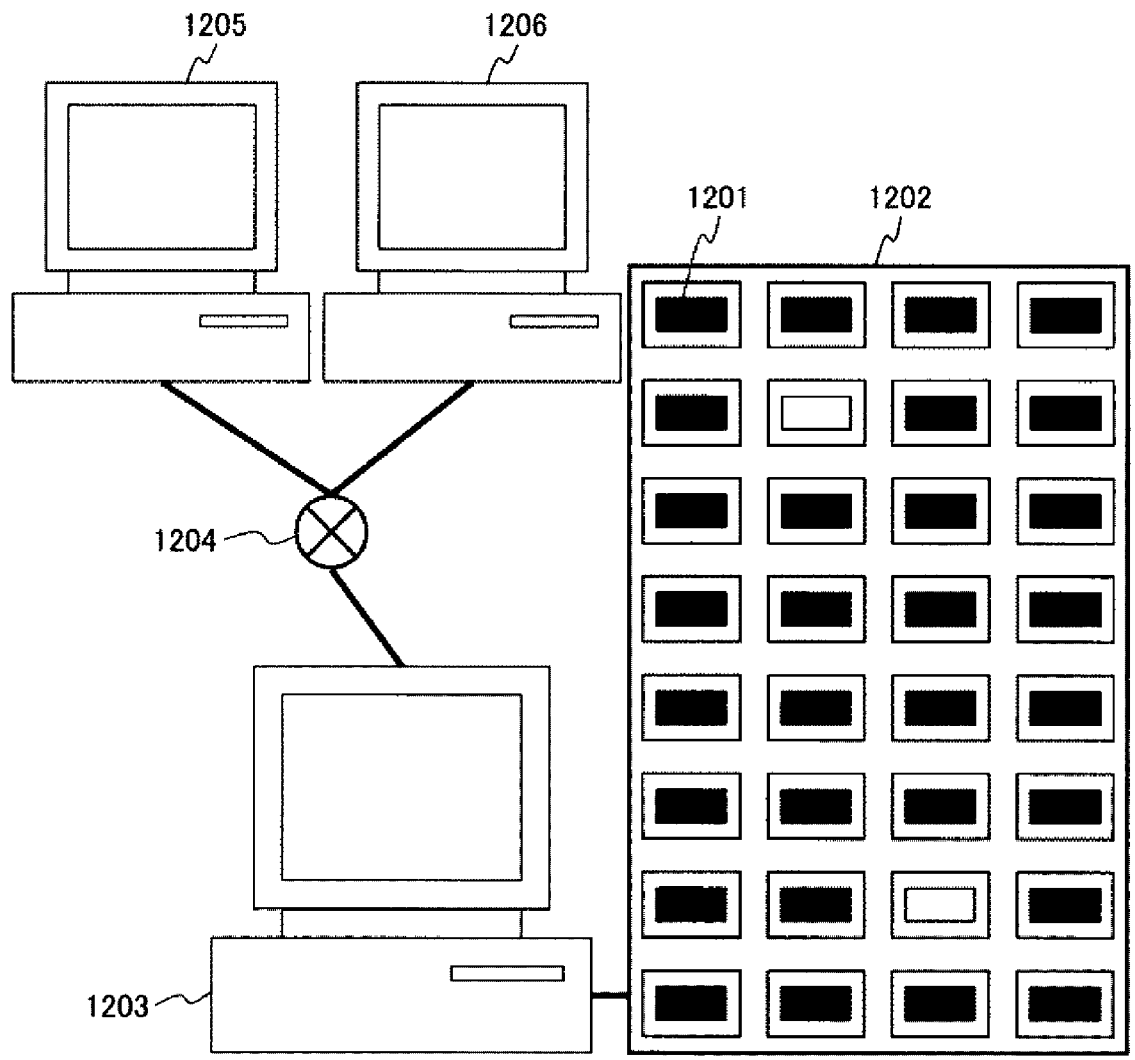
FIG. 12 is a view showing manufacturing flow of a HDD of the system for manufacturing a HDD of FIG. 8 utilizing a writing control database shown in FIG. 8, in accordance with an embodiment of the present invention.

With reference now to FIG. 12, in accordance with an embodiment of the present invention, a view is shown of manufacturing flow of a HDD of the system for manufacturing a HDD of FIG. 8 utilizing the writing control database 817. In the manufacturing of the HDD, self-writing of servo tracks is performed after assembling components such as a magnetic-recording head, an arm, a magnetic-recording disk, an actuator, and a control circuit board. In FIG. 12, a servo track self-writing device includes cells 1201 to which HDDs are connected to perform writing of servo tracks, a frame 1202 in which a plurality of cells are disposed, and a control PC 1203 for indicating a control program or manufacture conditions to each of the cells 1201. The control PC 1203 is connected to a manufacturing database 1205, identified with the manufacturing database 801, and a writing control database 1206, identified with the writing control database 817, via a network 1204.

Figure 13:
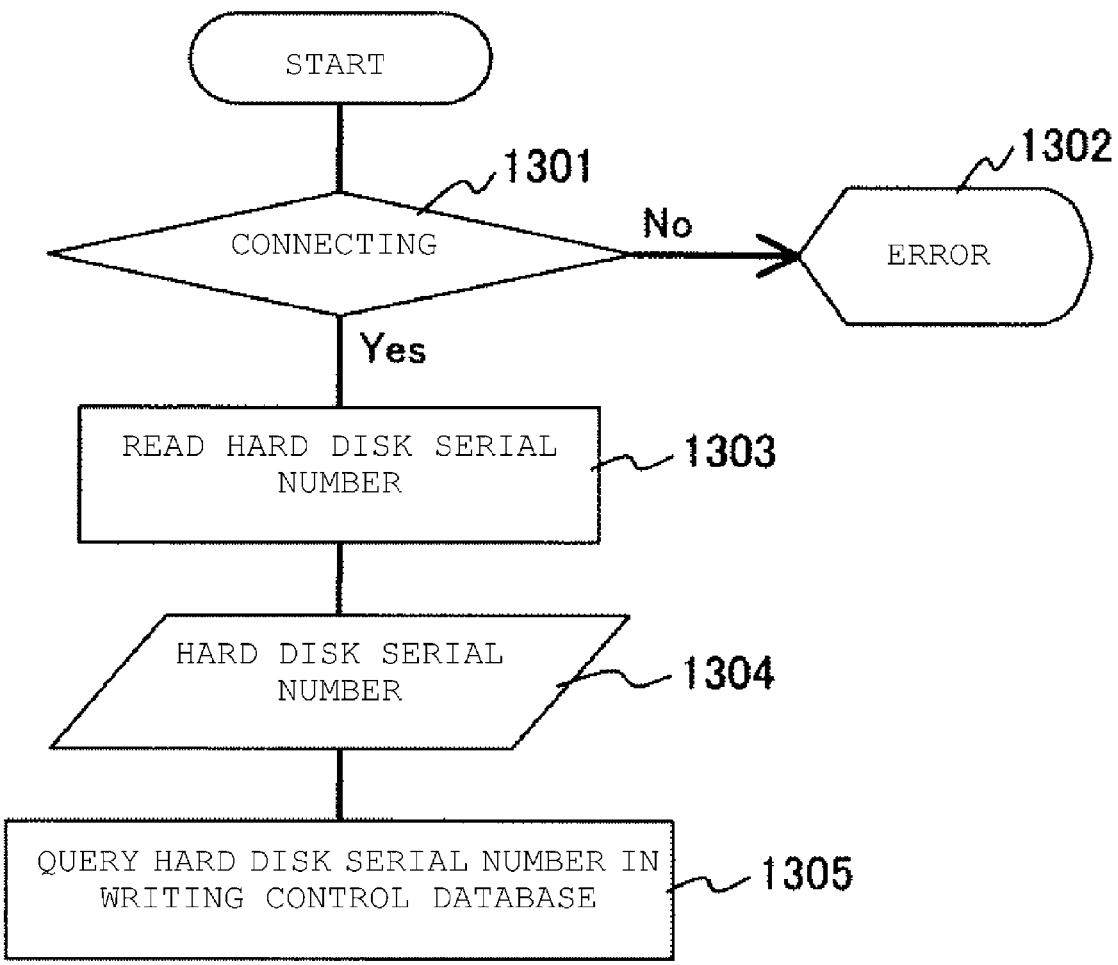
FIG. 13 is a flowchart showing the process after a HDD is connected to a servo track self-writing device, in accordance with an embodiment of the present invention.

With reference now to FIG. 13, in accordance with an embodiment of the present invention, a flowchart is shown that shows the process after a HDD is connected to the servo track self-writing device. An assembled HDD is connected to a connector in a cell within the servo track self-writing device by a manual operation, or by an automated carrier. After the connection, the connection status is confirmed first at a determination 1301, and if the connection is bad, an error 1302 is displayed, whereas if the connection is good, the process proceeds to a process 1303. In a process 1303, a product serial number 1304 of the connected HDD is read. The read product serial number 1304 of the HDD is sent to the writing control database 1206, identified with the writing control database 817, at a process 1305.

Figure 14:
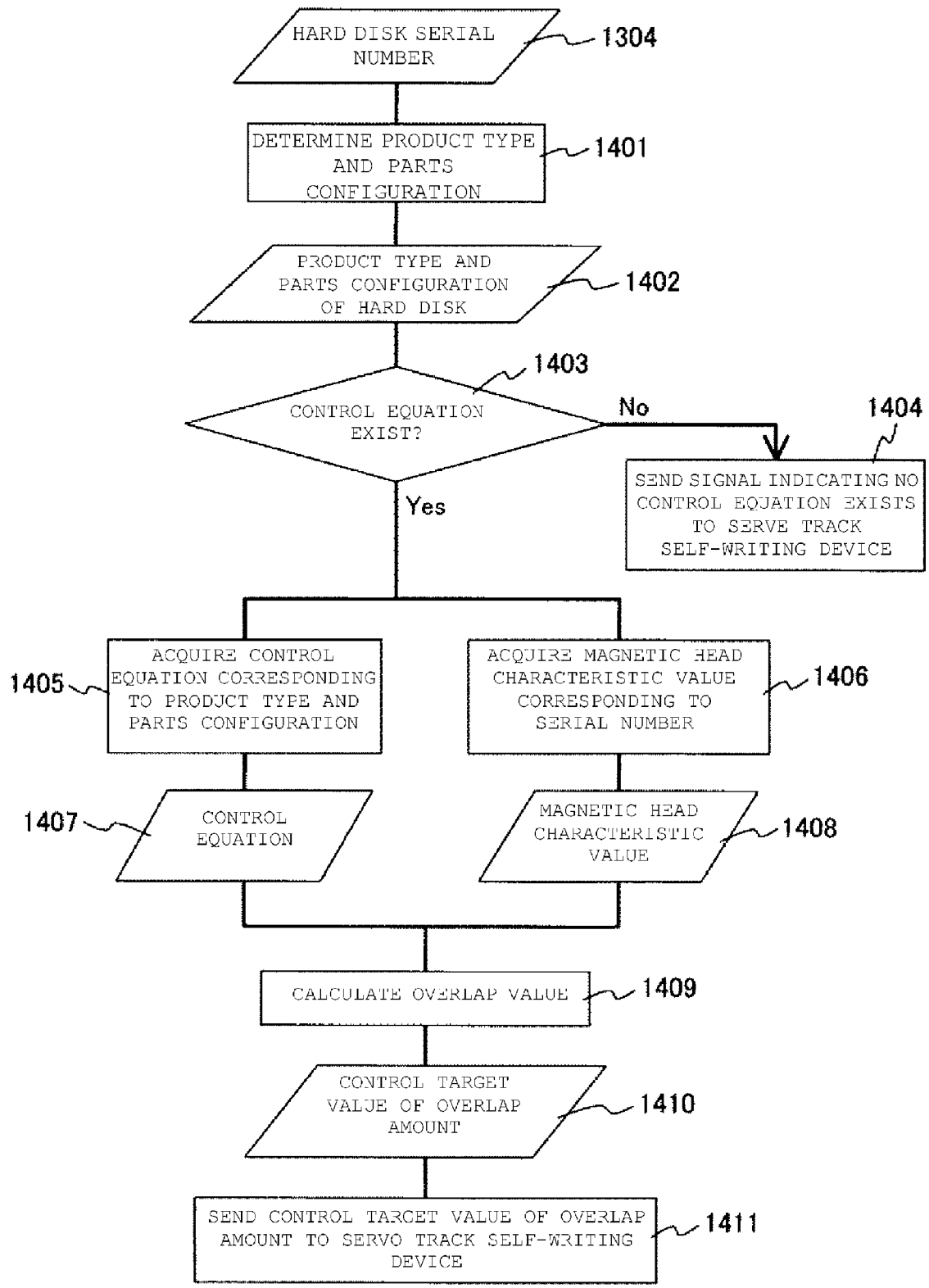
FIG. 14 is a flowchart showing the process after the writing control database shown in FIG. 8 receives a product serial number, in accordance with an embodiment of the present invention.
Figure 15:
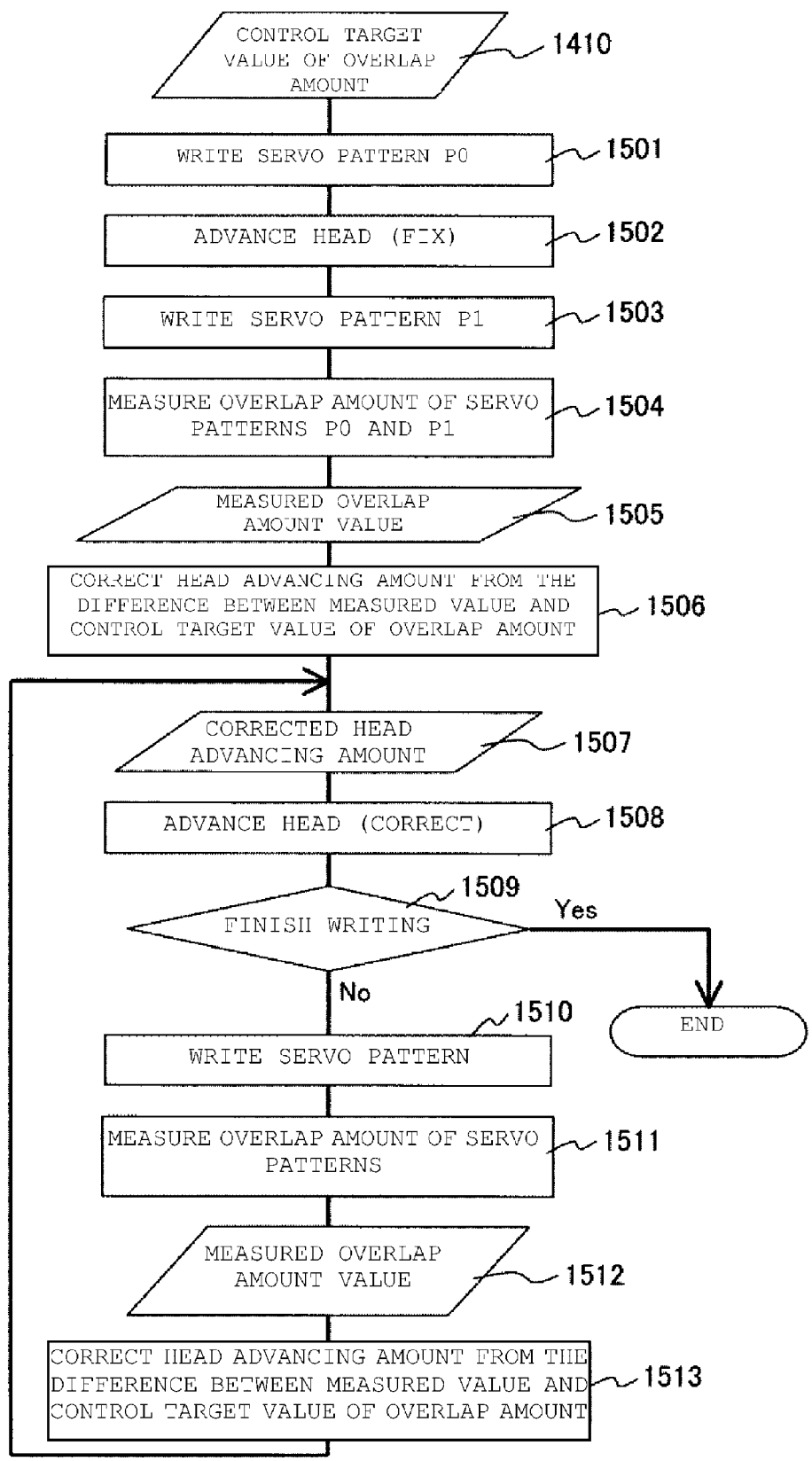
FIG. 15 is a flowchart showing the process of the servo track self-writing device, in accordance with an embodiment of the present invention.

With reference now to FIG. 14, in accordance with an embodiment of the present invention, a flowchart is shown that shows a process of the writing control database 1206, identified with the writing control database 817, that has received the product serial number 1304. The writing control database 1206 identifies the product type and components' configuration 1402 of the product serial number 1304 at a process 1401 from the product serial number 1304 of the HDD sent at the process 1305 based on the production history and the product information.

Next, in determination 1403, a determination is made as to whether or not a control equation corresponding to the identified product type and components' configuration 1402 exists in the control equation storing unit 818 shown in FIG. 8. If the control equation does not exist, a signal indicating that there is no control equation is returned to the servo track self-writing devices 819 through 822 at a process 1404. If the control equation exists, the process proceeds to a process 1405 and a process 1406.

At a process 1405, a control equation 1407 corresponding to the product type and components' configuration 1402 is acquired from the control equation storing unit 818 of FIG. 8.

At a process 1406, a characteristic value 1408 of the magnetic-recording head corresponding to the number 1304 is acquired from the magnetic-recording-head characteristic value storing unit 830 of FIG. 8.

Next, at a process 1409, an overlap amount control target value 1410 is calculated using the acquired control equation 1407 and the magnetic-recording-head characteristic value 1408.

The calculated overlap amount control target value 1410 is sent to the servo track self-writing devices at a process 1411.

With reference now to FIG. 14, in accordance with an embodiment of the present invention, a flowchart is shown that shows a process of the servo track self-writing devices 819 through 822. First, the servo track self-writing device that has received the overlap amount control target value 1410 writes servo pattern PO at a process 1501; and next, the servo track self-writing device moves the head at a fixed head advancing amount that has been predetermined by a manufacture condition at a process 1502. At this time, the direction in which the head is advanced is a peripheral direction from the center of the magnetic-recording disk, and the control unit of the actuator and the voice coil motor that are the drive mechanism for the head becomes the reference of the head advancing amount.

The head moved at the process 1502 writes a servo pattern P1 at a process 1503. Next, an overlap amount 1505 of the servo patterns PO and P1 is measured at a process 1504.

At a process 1506, the difference between the overlap amount 1505 measured at the process 1504 and the overlap amount control target value 1410 is calculated to correct the head advancing amount. Since the head advancing amount is the same as the track width, the advancing amount is corrected to be greater if the overlap amount is greater than the control target value, while the advancing amount is corrected to be smaller if the overlap amount is smaller than the control target value, according to the relationship of equation (1):

$$(TW=RW+SQ-(1-a/b)RW) \quad (1)$$

At a process 1508, the head is advanced by a corrected advancing amount 1507. Next, at determination 1509, a determination is made as to whether the position advanced at the process 1508 is at the end of the magnetic-recording disk, or the position advanced at the process 1508 satisfies a termination condition, for example, if a predetermined number of tracks have been written. If the position advanced at the process 1508 does not satisfy the termination condition, a servo pattern is written at a process 1510. At process 1511, the overlap amount of the written servo pattern and the servo pattern that has been written at one operation before is measured. At process 1513, a difference between the measured overlap amount value 1512 and the overlap amount control target value 1410 is calculated, and the head advancing amount is corrected.

Servo tracks can be written over the recording surface of the magnetic-recording disk by repeating the process from the processes 1507 to 1513 until the termination condition in the determination 1509 is satisfied.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for manufacturing a hard-disk drive, comprising:
   an operation of writing servo tracks by performing self-servo writing, said operation of writing servo tracks comprising:
      a first operation comprising:
         producing a first control equation for obtaining a servo pattern overlap amount that is used as a control target value during actual servo track writing, from a written servo track pitch, a servo pattern overlap amount that is a control target value at a time of writing, and a magnetic-recording-head characteristic value,
         arranging a root-mean-square error (RMSE) into series, and
         converting said RMSE into a probability distribution;
      a second operation comprising calculating a second control target value of a second written servo track pitch that results in an increased product yield, from said first written servo track pitch, product defect information, and said RMSE probability distribution;
      a third operation comprising producing a second control equation for obtaining a calculated servo pattern overlap amount for said magnetic-recording-head characteristic value, said calculated servo pattern overlap amount being a calculated control target value for writing a servo track with a calculated servo track pitch, by assigning said second control target value of said second servo track pitch into said first control equation;
      a fourth operation comprising calculating said calculated control target value of said calculated servo pattern overlap amount using said second control equation and said magnetic-recording-head characteristic value; and
   an operation of writing servo tracks into said hard-disk drive using said calculated control target value of said calculated servo pattern overlap amount.

2. The method for manufacturing a hard-disk drive of claim 1, wherein said written servo track pitch, said servo pattern overlap amount that is said control target value at said time of writing, and said magnetic-recording-head characteristic value are information accumulated as a production history; said written servo track pitch, and said servo pattern overlap amount that is said control target value at said time of writing are stored in a unit of said product serial number of said hard-disk drive; and, said magnetic-recording-head characteristic value is stored in a unit selected from said group consisting a unit of said product serial number of said magnetic-recording head and a unit of said part number of components of a combination of a magnetic-recording head and an arm.

3. The method for manufacturing a hard-disk drive of claim 1, wherein said magnetic-recording-head characteristic value comprises a parameter selected from said group consisting of a read width and a squeeze amount.

4. The method for manufacturing a hard-disk drive of claim 3, wherein said magnetic-recording-head characteristic value further comprises a magnetic characteristic value selected from said group consisting of an overwrite characteristic value, a main magnetic pole size, and an error rate.

5. The method for manufacturing a hard-disk drive of claim 1, wherein said first control equation is a multiple regression equation obtained by subjecting said written servo track pitch, said servo pattern overlap amount that is said control target value at said time of writing, and said magnetic-recording-head characteristic value, to a multiple regression analysis.

6. The method for manufacturing a hard-disk drive of claim 5, wherein said RMSE is output by said multiple regression analysis.

7. A system for manufacturing a hard-disk drive, comprising:
   a manufacturing database for storing: product defect information, a written servo track pitch, a servo pattern overlap amount that is a control target value at a time of writing, and a magnetic-recording-head characteristic value of a hard-disk drive, based on a production history;
   a model computing unit comprising:
      a control equation computing unit for producing a first control equation for obtaining a servo pattern overlap amount used as a control value during actual servo track writing, from said written servo track pitch, said servo pattern overlap amount that is said control target value at said time of writing, and said magnetic-recording-head characteristic value, and for arranging root-mean-square error (RMSE) into series and for converting said RMSE into a probability distribution; and
      a probability model computing unit for producing a second control equation by calculating a second control target value of a written servo track pitch that results in an increased product yield from said product defect information, said written servo track pitch, and said RMSE probability distribution, and for obtaining a calculated servo pattern overlap amount for said magnetic-recording-head characteristic value, said calculated servo pattern overlap amount being a calculated control target value for writing a servo track with a calculated servo track pitch, by assigning said second control target value into said first control equation;
   a writing control database for receiving and storing said second control equation from said model computing unit, for receiving and storing said magnetic-recording-head characteristic value from said manufacturing database, for receiving a product serial number and product information used for servo track writing such as a magnetic-recording-head number of a currently-equipped hard-disk drive from a servo self-writing device, for selecting said second control equation corresponding to said product information, for selecting said magnetic-recording-head characteristic value corresponding to said product information and said selected second control equation, and for calculating for said product information said calculated control target value of said calculated servo pattern overlap amount; and a servo self-writing device for writing servo tracks into a currently-equipped hard-disk drive using said calculated control target value of said calculated servo pattern overlap amount.

8. The system for manufacturing a hard-disk drive of claim 7, wherein said magnetic-recording-head characteristic value comprises a parameter selected from said group consisting of a read width and a squeeze amount.

9. The system for manufacturing a hard-disk drive of claim 8, wherein said magnetic-recording-head characteristic value further comprises a magnetic characteristic value selected from said group consisting of an overwrite characteristic value, a main magnetic pole size, and an error rate.

10. The system for manufacturing a hard-disk drive of claim 7, wherein said first control equation is a multiple regression equation obtained by subjecting said written servo track pitch, said servo pattern overlap amount that is said control target value at said time of writing, and said magnetic-recording-head characteristic value, to a multiple regression analysis.

* * * * *